United States Patent
Mizuyoshi (10) Patent No.: US 6,529,309 B2
(45) Date of Patent: Mar. 4, 2003

(54) PRODUCTION METHOD OF LIGHT WAVELENGTH CONVERTING ELEMENT

(75) Inventor: Akira Mizuyoshi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 106 days.

(21) Appl. No.: 09/860,489

(22) Filed: May 21, 2001

(65) Prior Publication Data

US 2001/0055144 A1 Dec. 27, 2001

(30) Foreign Application Priority Data

May 22, 2000 (JP) ........................... 2000-149972

(51) Int. Cl.[7] .............................. G02F 1/09; G02F 1/35
(52) U.S. Cl. ..................... 359/280; 359/326; 359/328; 359/330
(58) Field of Search ............................. 359/280, 281, 359/282, 283, 326, 327, 328, 329, 330, 331, 332

(56) References Cited

U.S. PATENT DOCUMENTS

| 5,380,410 A | * | 1/1995 | Sawaki et al. | 361/225 |
| 5,615,041 A | * | 3/1997 | Field et al. | 359/326 |
| 5,652,674 A | * | 7/1997 | Mizuuchi et al. | 359/326 |

FOREIGN PATENT DOCUMENTS

| JP | 4-335620 | 11/1992 | G02F/1/35 |
| JP | 5-210132 | 8/1993 | G02F/1/35 |
| JP | 6-194706 | 7/1994 | G02F/1/37 |
| JP | 6-242478 | 9/1994 | G02F/1/37 |
| JP | 9-218431 | 8/1997 | G02F/1/37 |
| JP | 2969787 | 8/1999 | G02F/1/37 |

* cited by examiner

Primary Examiner—Georgia Epps
Assistant Examiner—Tim Thompson
(74) Attorney, Agent, or Firm—Sughrue Mion, PLLC (57) ABSTRACT

A light wavelength converting element having a periodic polarization inversion structure is produced in the following manner: a comb-shaped electrode and a plate electrode are attached to both surfaces of an MgO—LN substrate, and the MgO—LN substrate is immersed in an insulating liquid. In a state in which substrate temperature is at room temperature, the plate electrode is grounded and a pulse voltage of +0.75 kV, for example, is applied for one second such that the comb-shaped electrode has positive potential. Then, the comb-shaped electrode is grounded and a pulse voltage of −3.25 kV, for example, is applied for ten seconds such that the plate electrode has negative potential.

10 Claims, 5 Drawing Sheets

PRODUCTION METHOD OF LIGHT WAVELENGTH CONVERTING ELEMENT

BACKGROUND OF THE INVENTION

1. Field of the Invention

The present invention relates to a production method of a light wavelength converting element, and specifically to a production method of a light wavelength converting element in which the light wavelength converting element is produced by forming a periodic polarization inversion structure in a unipolarized ferroelectric crystal substrate having a non-linear optical effect.

2. Description of the Related Art

It is widely known that a fundamental wave can be converted to a second harmonic by using a light wavelength converting element in which is provided a region where spontaneous polarization (domain) of a ferroelectric having a non-linear optical effect is periodically inverted. Examples of light wavelength converting elements using this method include an optical waveguide type light wavelength converting element, in which an optical waveguide is formed in a ferroelectric crystal substrate having a non-linear optical effect, a periodic polarization inversion structure, in which orientation of spontaneous polarization of the substrate is inverted, is formed at the optical waveguide, and a fundamental wave guided through the optical waveguide is thereby converted to a second harmonic.

Conventionally, this periodic polarization inversion structure is formed by forming a comb-shaped electrode on a surface of a unipolarized ferroelectric crystal substrate having a non-linear optical effect, at a side where spontaneous polarization of the substrate is negative, forming a plate electrode on a surface thereof, at a side where the spontaneous polarization is positive, and then applying a high voltage between the two electrodes under an insulated condition, such as in a vacuum or in an insulating liquid, such that the comb-shaped electrode has positive potential and the plate electrode has negative potential.

Especially, when the voltage is applied in an insulating fluorine-based liquid, such as Fluorinert (trade name; manufactured by 3M Ltd., United States), having excellent insulating property, a minimum amount of voltage required for inversion (coercive voltage) is several times as much as an amount required if the voltage were applied in a vacuum. For example, if the voltage is applied between a comb-shaped electrode formed with a period of 4.75 μm on an MgO—LiNbO$_3$ substrate and a plate electrode having a suitable distance from the comb-shaped electrode (grounded electrode) so as to invert the polarization, the coercive voltage in a vacuum is about 3 kV, and in Fluorinert is 8 kV. In order to form uniform inversion regions, a voltage of 10 kV needs to be applied for at least 8 seconds.

As described above, the polarization inversion is carried out by applying a voltage which is at the coercive voltage or higher. However, if the applied voltage is too high, cracks are generated near the electrodes, and if a voltage which exceeds a predetermined value (breakdown voltage) is applied, the crystal will be broken. Especially in the above-described optical waveguide type light wavelength converting element, in which the comb-shaped electrode is formed adjacent to the optical waveguide, this generation of cracks is an important problem, because propagation loss of the optical waveguide will be increased by the generation of cracks. Further, if the applied voltage is increased, there is another problem in that a high-voltage power supply and a pressure-tight design are required, which results in a large-scale production apparatus. On the other hand, if the applied voltage is decreased, the generation of cracks is prevented. However, in this case there is a problem in that a region where inversion is not carried out in accordance with the electrode pattern occurs, which reduces production yield of the element.

In Patent Gazette No. 2,969,787, a domain-controlling method for a non-linear ferroelectric optical material, in which a pulse voltage is applied so as to invert a polarization, was suggested. If a DC voltage is applied, too much current flows, and a crystal is thereby broken. On the other hand, in this method, a pulse voltage is applied so that too much current does not flow, and the problem of crystal breakage is thereby avoided.

However, even when the pulse voltage is applied, if the applied voltage is too high, cracks are generated near the electrodes, and if a voltage which is at a breakdown voltage or higher is applied, the crystal is broken as mentioned above. In Patent Gazette No. 2,969,787, there was a description that a voltage is applied in a state in which the non-linear ferroelectric optical material has been heated to a high temperature such that the coercive voltage can be decreased. However, this heating to a high temperature causes problems in that the non-linear ferroelectric optical material is deteriorated and the surface thereof is contaminated. Further, in the wavelength converting element, when a ratio of width of a domain inversion portion of the periodic polarization inversion structure to width of the domain non-inversion portion (duty ratio) is closer to 1:1, wavelength converting efficiency becomes higher. Width and depth of the domain inversion portions of the periodic polarization inversion structure are controlled by the quantity of current flowing when the voltage is applied. However, if the pulse voltage is applied in an insulating liquid, the current flows only in an instant in which the voltage is changed. Accordingly, in this case, it is difficult to control the width and the depth of the domain inversion portion, and this causes a problem in that a desired periodic polarization inversion structure cannot be formed.

In Japanese Patent Application Laid-Open (JP-A) No. 4-335620, there was a description that voltage value and pulse width of the applied pulse voltage are suitably selected such that width and depth of the polarization inversion region can be controlled. In JP-A No. 5-210132, there was a description that pulse width and number of applications of the applied pulse voltage are suitably selected such that width and depth of the polarization inversion region can be controlled. However, if the applied voltage is too high, cracks are generated near the electrodes, and if a voltage which is at a breakdown voltage or higher is applied, the crystal is broken as mentioned above. Further, the above-described problem caused when a pulse voltage is applied in an insulating liquid could not be solved.

SUMMARY OF THE INVENTION

In view of the above problems of the prior art, an object of the present invention is to provide a production method of a light wavelength converting element, in which a uniform periodic polarization inversion structure can be formed in a unipolarized ferroelectric crystal substrate having a non-linear optical effect by applying a low voltage thereto, and the light wavelength converting element can be produced with excellent yield.

Further, another object of the present invention is to provide a production method of a light wavelength converting element, in which a uniform periodic polarization inversion structure can be formed even in an insulating liquid, and the light wavelength converting element can be produced with excellent yield.

In order to attain the above objects, a first aspect of the present invention is a method for producing a light wavelength converting element, the method comprising steps of: forming a first electrode having a predetermined pattern on a surface of a unipolarized ferroelectric crystal substrate having a non-linear optical effect, at a side where spontaneous polarization of the substrate is negative, and forming a second electrode opposite to the first electrode; and grounding the second electrode and applying a first pulse voltage such that the first electrode has positive potential, and then grounding the first electrode and applying a second pulse voltage such that the second electrode has negative potential, so as to form a periodic polarization inversion structure in the ferroelectric crystal substrate.

In the present invention, the first electrode having the predetermined pattern is formed on the surface of the unipolarized ferroelectric crystal substrate having a non-linear optical effect, at a side where the spontaneous polarization of the substrate is negative, and the second electrode is formed opposite to the first electrode. When a pulse voltage is to be applied between the first electrode and the second electrode, the second electrode is grounded and the pulse voltage is applied such that the first electrode has positive potential and accumulates charge. Then, the first electrode is grounded and the pulse voltage is applied such that the second electrode has negative potential. Thus, the charge accumulated when the voltage is switched moves such that a current flows. As a result, orientation of polarization is inverted. Thickness of domain inversion portions of the periodic polarization inversion structure is controlled by the quantity of current flowing at the time of inversion. In order to obtain a desired quantity of current, the potential difference needs to be increased. However, in accordance with the method of the present invention, the charge which is accumulated when the second electrode is grounded and the pulse voltage is applied such that the first electrode has positive potential flows all at once, and a sufficient quantity of current can be obtained. Accordingly, even with an applied voltage lower than a conventional voltage, the uniform periodic polarization inversion structure can be formed, and the light wavelength converting element can be produced with excellent yield.

Especially, when the pulse voltage is applied in an insulating liquid, the current flows only in an instant in which the voltage is changed, and thus the quantity of current is insufficient. However, in accordance with the method of the present invention, a sufficient quantity of current can be obtained without increasing the voltage, and the uniform periodic polarization inversion structure can be formed.

The process in which the second electrode is grounded and the pulse voltage is applied such that the first electrode has positive potential and then the first electrode is grounded and the pulse voltage is applied such that the second electrode has negative potential may be repeated a plurality of times. Thus, although the load on the crystal substrate at each time of applying the pulse voltage is reduced, the quantity of current required for the inversion can be obtained. Therefore, the generation of cracks can be more reliably prevented, and charge can be uniformly applied in the crystal substrate. Further, the width and the depth of the domain inversion portion of the periodic polarization inversion structure can be easily controlled.

Further, the pulse voltage may be applied in a state in which the ferroelectric crystal substrate is at a temperature of at least 40° C. When the substrate temperature is increased, the coercive voltage is decreased. Thus, if the pulse voltage is applied in the state in which the ferroelectric crystal substrate is at the temperature of at least 40° C., the periodic polarization inversion structure can be formed with an even lower applied voltage.

Furthermore, the pulse voltage may be applied in a state in which the ferroelectric crystal substrate is in a vacuum or in an insulating liquid. If the pulse voltage is applied under an insulated condition, current leaks can be prevented, and the light wavelength converting element can be produced with excellent yield. Since the insulating liquid has more excellent insulating property than the vacuum, the pulse voltage is preferably applied in a state in which the ferroelectric crystal substrate is in the insulating liquid.

DESCRIPTION OF THE PREFERRED EMBODIMENTS

Hereinafter, a production method of a light wavelength converting element of the present invention will be described in detail.

(First Embodiment)

Figure 1:
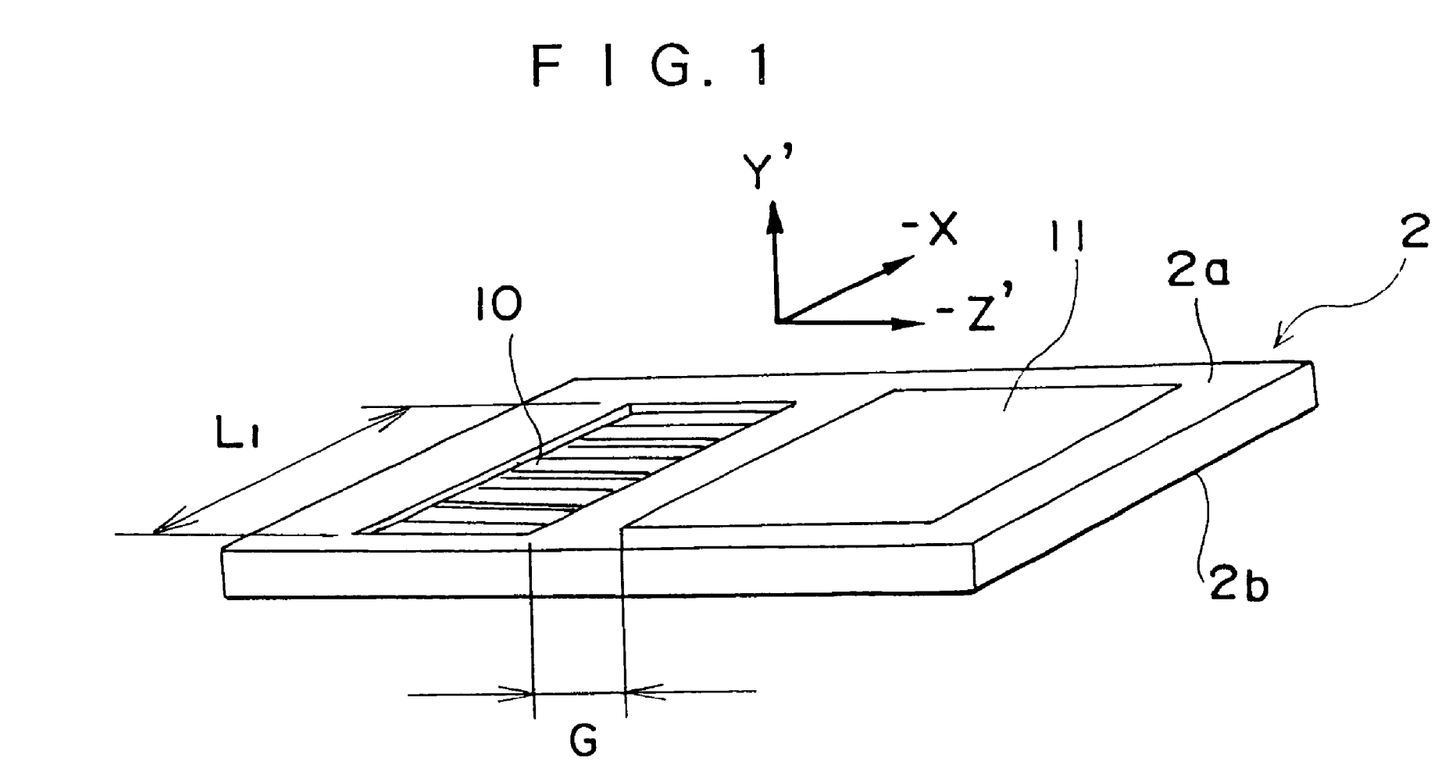
FIG. 1 is a schematic view showing an appearance of a light wavelength converting element in a production method according to a first embodiment.
Figure 2:
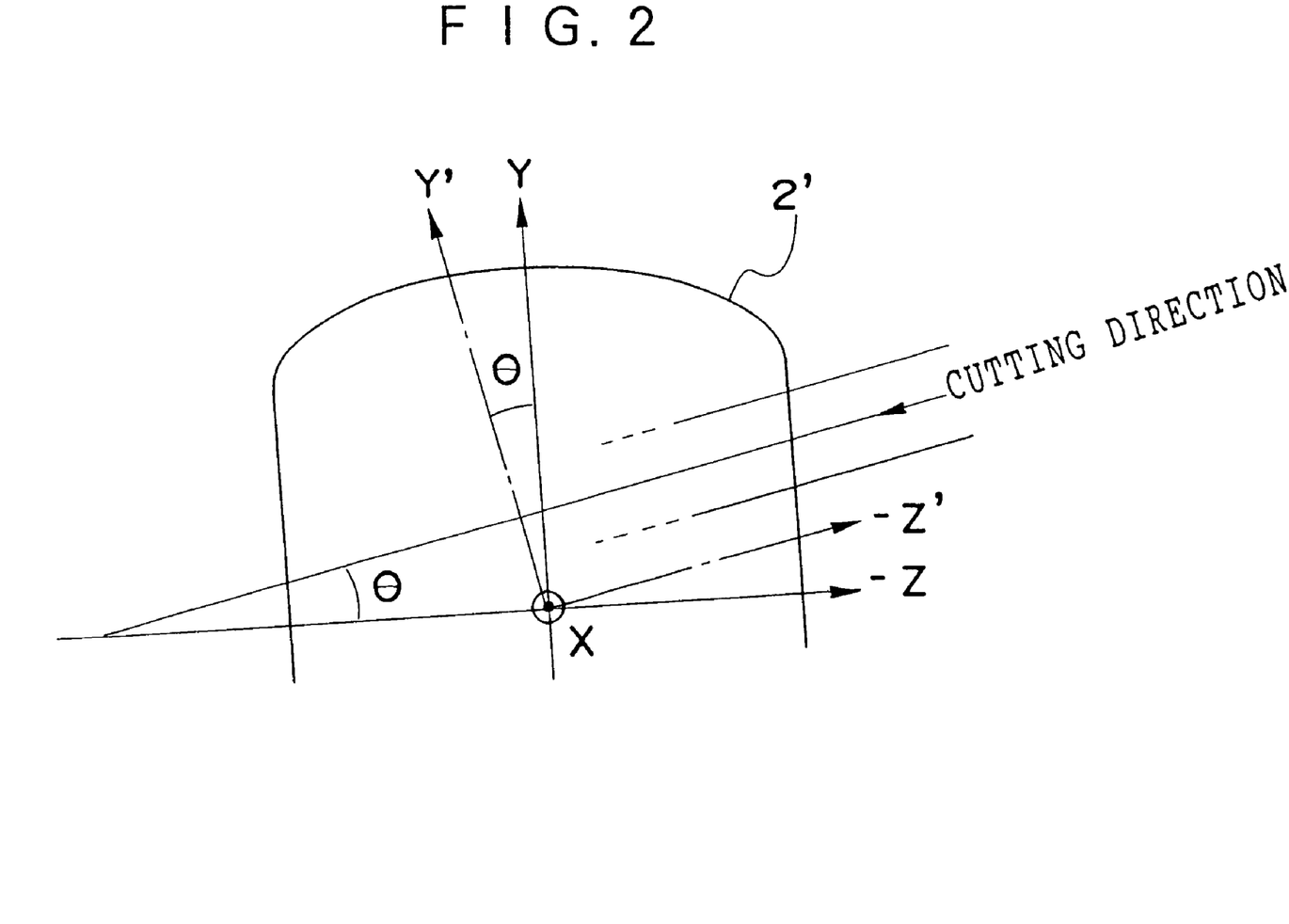
FIG. 2 is a schematic view explaining a state of cutting of a substrate which is used in the light wavelength converting element.

With reference to FIG. 1 and the like, a first embodiment of the present invention will be described. The first embodiment is an example in which an optical waveguide type light wavelength converting element is produced. In FIG. 1, the reference numeral 2 indicates an $LiNbO_3$ substrate, which serves as a ferroelectric crystal substrate having a non-linear optical effect and which is doped with MgO in an amount of 5 mol % (hereinafter, this substrate is referred to as an MgO—LN substrate). The MgO—LN substrate 2 is obtained by cutting an MgO—LN ingot 2' in a direction which is at an angle θ of 3° to a Z-axis, as shown in FIG. 2, and then polishing the cut ingot 2'. The MgO—LN substrate 2 is unipolarized, and is formed so as to have a thickness of 0.4 mm, for example. Further, the accuracy of this polish angle θ of 3° is ±0.1°. A direction which is parallel to surfaces 2a and 2b of the MgO—LN substrate 2 formed in the above manner and which is orthogonal to an X-axis, and a direction which is perpendicular to the surfaces 2a and 2b are at angles θ of 3° to the Z-axis and a Y-axis, respectively. Therefore, these directions are appropriately referred to as direction Z' and direction Y', respectively.

As shown in FIG. 1, a comb-shaped electrode 10, which is a first electrode, and a plate electrode 11, which is a second electrode, are respectively attached to the surfaces 2a and 2b of the MgO—LN substrate 2, and, in order to prevent current leaks, the MgO—LN substrate 2 is immersed in an insulating liquid such as Fluorinert FC-40 (trade name; manufactured by 3M Ltd., United States).

The comb-shaped electrode 10 and the plate electrode 11 can be formed by well-known photolithography or the like, using an electrode material such as Cr or the like, whose electric conductivity is sufficiently lower than that of the MgO—LN substrate 2. In this embodiment, thickness of each electrode is 20 to 100 $\mu$m, length $L_1$ of each electrode is 8 mm, cycle of the comb-shaped electrode 10 is 4.75 $\mu$m, a length and a width of an electrode finger are 400 $\mu$m and 0.5 $\mu$m, respectively, and a width (i.e., a dimension in direction Z') of the plate electrode 11 is 100 $\mu$m.

A gap G between the comb-shaped electrode 10 and the plate electrode 11 is selected in accordance with the substrate material used such that a breakdown voltage is not lower than a coercive voltage. For example, in the case of the MgO—LN substrate, the gap G is preferably 200 to 500 $\mu$m. If the gap G is smaller than 200 $\mu$m, the coercive voltage approaches the breakdown voltage, and thus there will be a risk that the crystal can be broken due to variations in crystal quality. On the other hand, if the gap G is larger than 500 $\mu$m, the coercive voltage also increases, and thus productivity decreases. In this embodiment, the gap G is 400 $\mu$m.

Figure 4A:
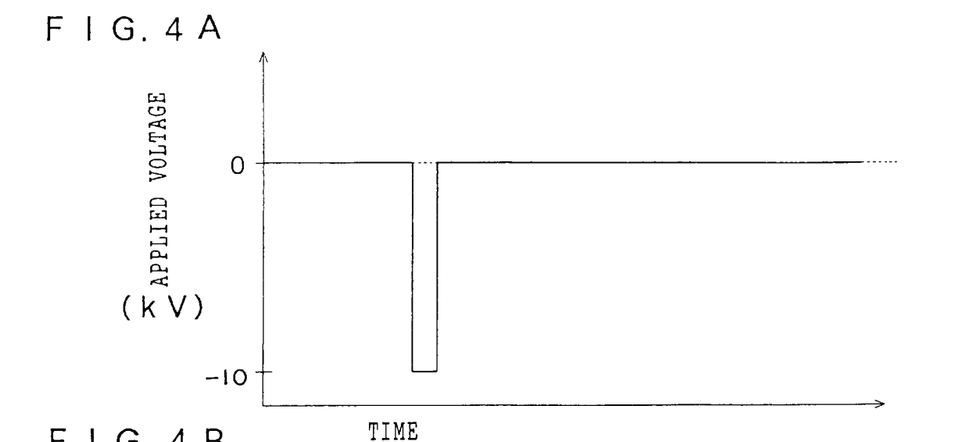
FIG. 4A is a timing diagram showing a pulse waveform of an applied voltage in a conventional embodiment.
Figure 4B:
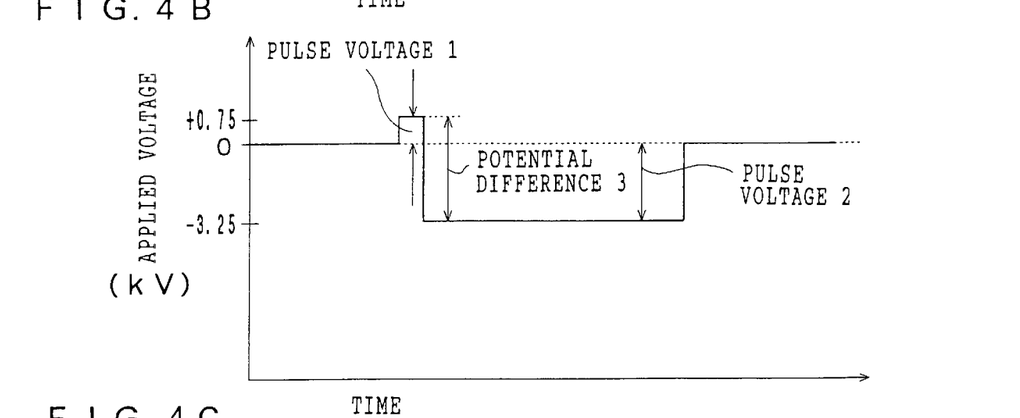
FIG. 4B is a timing diagram showing a pulse waveform of an applied voltage in the first embodiment.

Then, in a state in which substrate temperature is at room temperature, the plate electrode 11 is grounded and a pulse voltage 1 of +0.75 kV, for example, is applied for one second such that the comb-shaped electrode 10 has positive potential. Thereafter, the comb-shaped electrode 10 is grounded and a pulse voltage 2 of −3.25 kV, for example, is applied for ten seconds such that the plate electrode 11 has negative potential. The pulse waveform in this method is shown in FIG. 4B. Further, for purposes of comparison, a pulse waveform from a conventional method, in which a pulse voltage is applied such that the comb-shaped electrode 10 has positive potential and the plate electrode 11 has negative potential, is shown in FIG. 4A. In FIG. 4A, a pulse voltage of −10 kV is applied for ten seconds.

Figure 3:
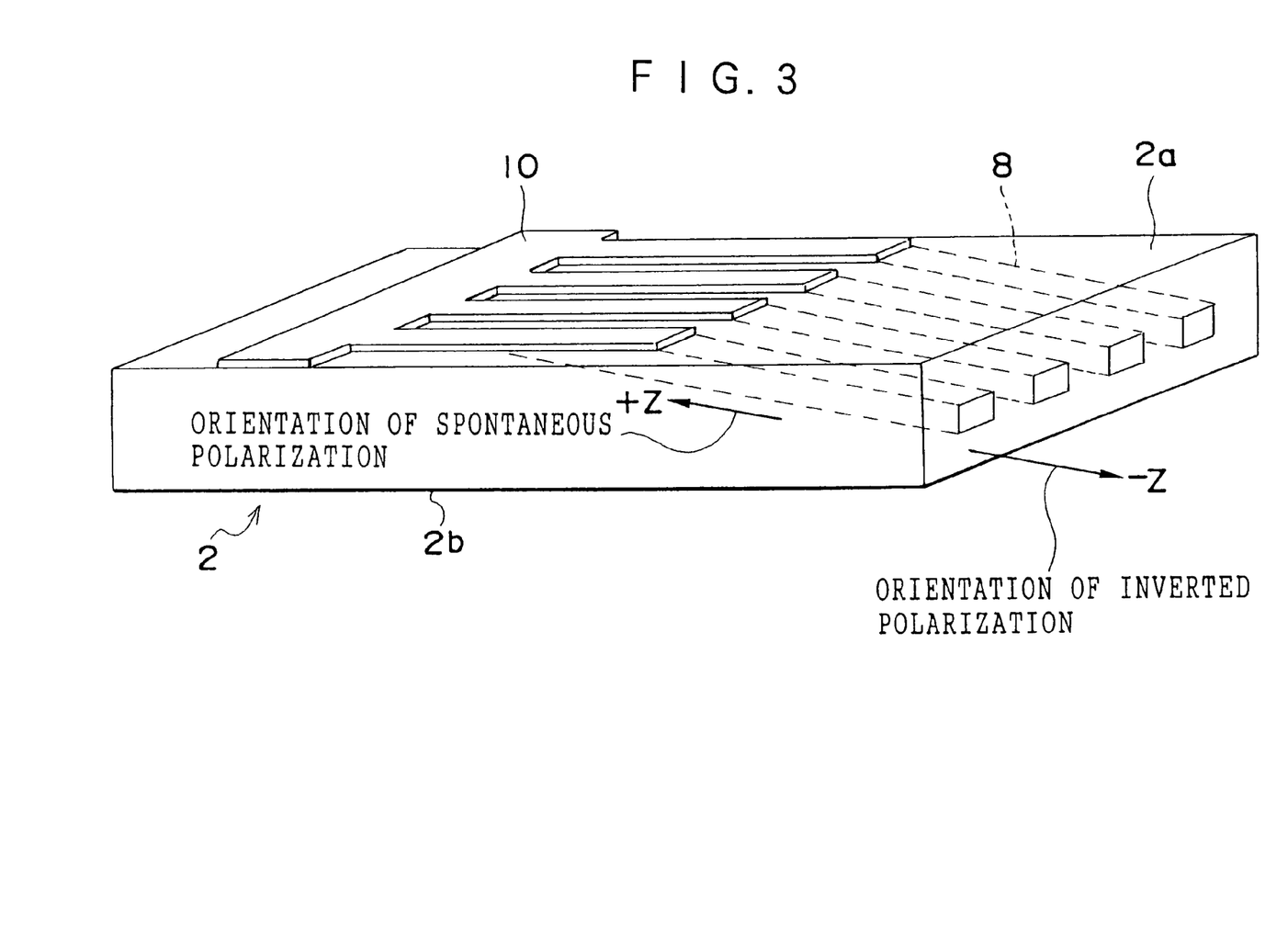
FIG. 3 is a schematic perspective view showing domain inversion portions which are formed in the light wavelength converting element.

When the pulse voltages are applied between the electrodes 10 and 11 in the above-described manner, as schematically shown in FIG. 3, orientation of spontaneous polarization of the substrate 2, which was oriented in direction +Z, is inverted at the voltage applied portion so as to form domain inversion portions 8. Further, the orientation of the spontaneous polarization inclines at angle θ, 3°, from the substrate surface 2a. Thus, the orientation of the polarization of the domain inversion portions 8 also inclines from the substrate surface 2a at the same angle. In FIG. 3, illustration of the plate electrode 11 is omitted.

The pulse voltage 1 has voltage value and pulse width of a degree such that the crystal is not broken. In this embodiment, a voltage of +1 kV, for example, can be applied for up to 40 seconds. However, if a voltage of +2 kV is applied for a time which exceeds 10 seconds, the longer the voltage continues to be applied, the greater the likelihood that the crystal will be broken. If a voltage of +2 kV is applied for a time which exceeds 20 seconds, the crystal will be broken. If a voltage of +2.5 kV is applied, the crystal will be instantaneously broken. Therefore, as the pulse voltage 1, a pulse voltage of +0.5 to +1.5 kV is preferably applied for 0.1 to 20 seconds. Further, if the pulse voltage 1 is applied for a longer time, the domain inversion portions 8 can be more deeply formed.

The voltage value and pulse width of the pulse voltage 2 may be selected from within ranges such that the crystal will not be broken, and the voltage value is not less than the coercive voltage. In this embodiment, as shown in FIG. 4B, after the pulse voltage 1 has been applied, the pulse voltage 2 is selected such that a potential difference 3 between the pulse voltage 1 and the pulse voltage 2 is 4 kV or more. The selected pulse voltage 2 is applied for 1 to 10 seconds. As a result, a uniform periodic polarization inversion structure can be formed without the crystal being broken. If the potential difference 3 is less than 4 kV, a sufficient quantity of current cannot be obtained, and the uniform periodic polarization inversion structure cannot be formed. Further, in this embodiment, the crystal is broken when a voltage of −12 kV is applied for one second. Therefore, the pulse voltage 2 is a negative voltage which is smaller than 12 kV. In order to prevent generation of cracks, the pulse voltage 2 is preferably a negative voltage no larger than 6 kV.

For example, in the above example, because the pulse voltage 1 is +0.75 kV, the pulse voltage 2 of −3.25 kV can be applied. Other conditions being the same, in the conventional method (the method in which a pulse voltage is applied such that the comb-shaped electrode 10 has positive potential and the plate electrode 11 has negative potential), if a voltage of −10 kV is not applied for at least 8 seconds, a polarization inversion region is not formed. On the other hand, in this embodiment, even with a voltage (−3.25 kV) which is less than half of that above, the uniform periodic polarization inversion structure can be formed.

In this embodiment, as described above, the positive pulse voltage 1 is applied such that the comb-shaped electrode, which is formed on the substrate surface at a side where the spontaneous polarization is negative, has positive potential, and thereafter the negative pulse voltage 2 is applied such that the plate electrode has negative potential. Thus, the charge accumulated when the positive pulse voltage 1 was applied moves all at once in accordance with the caused potential difference 3, such that a large quantity of current flows. As a result, even in an insulating liquid such as Fluorinert, a quantity of current (a quantity of movement of carriers) required to obtain a desired inversion thickness can be obtained. Accordingly, even with an applied voltage lower than a conventional voltage, the uniform periodic polarization inversion structure can be formed, and the light wavelength converting element can be produced without the crystal being broken and with excellent yield.

In this case, in which the polarization inversion is carried out in Fluorinert having excellent insulating property, the production yield is improved as compared with the case in which the polarization inversion is carried out in a vacuum. Further, when the positive pulse voltage is applied for a longer time, the domain inversion portion can be more deeply formed as compared with a conventional domain inversion portion (which has a depth of about 1 $\mu$m).

Figure 5:
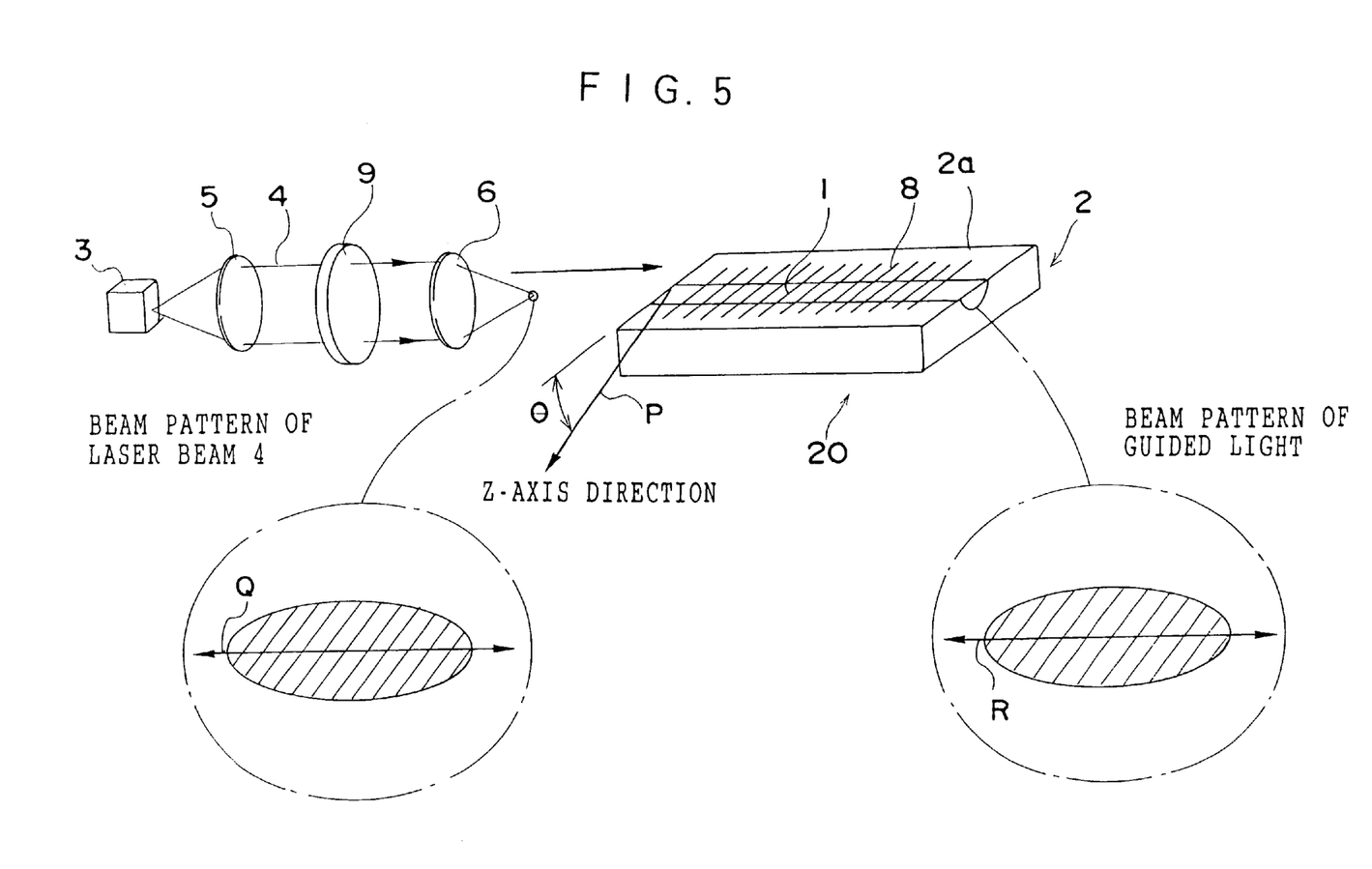
FIG. 5 is a schematic view showing a state of use of the light wavelength converting element.

Next, a channel optical waveguide is formed in the MgO—LN substrate 2 in the following manner. First, a metal (Ta in this embodiment) mask having a width in direction Z' of about 5 to 9 $\mu$m is formed by well-known photolithography near distal ends of the comb-shaped electrode 10, where the domain inversion is the deepest. Then, the MgO—LN substrate 2 is subjected to a proton exchanging process in pyrophosphoric acid at 160° C. for 64 minutes, and the Ta mask is removed by an etchant. After that, the MgO—LN substrate 2 is annealed in an atmosphere at 350° C. for an hour. Due to these processes, as shown in FIG. 5, the channel optical waveguide 1, which extends along a direction in which the domain inversion portions 8 are lined up, is formed. Next, −X and +X surfaces of the MgO—LN substrate 2, which surfaces include end surfaces of the channel optical waveguide 1, are optically polished so as to complete the light wavelength converting element.

As shown in FIG. 5, a light wavelength converting module is structured by a light wavelength converting element 20, a semiconductor laser 3, serving as a light source of a fundamental wave, and fundamental wave incidence optical system (consisting of a collimator lens 5 and a collective lens 6). As the semiconductor laser 3, a laser having an oscillation wavelength at a 950 nm band is used. A laser beam 4 emitted from the semiconductor laser 3 enters into the light wavelength converting element 20 so as to generate a second harmonic having a wavelength which has been reduced by half. At this time, due to the periodic domain inversion structure which is formed by periodically aligning the domain inversion portion 8 along a direction in which the laser beam 4 is guided, the laser beam 4 fundamental wave and the second harmonic are phase-matched (so-called pseudo phase matching). In this embodiment, a bandpass filter 9 is disposed between the collimator lens 5 and the collective lens 6 so as to lock a longitudinal mode of the semiconductor laser 3.

In the light wavelength converting module, the orientation of spontaneous polarization of the MgO—LN substrate 2, i.e., the Z-axis direction, is not perpendicular to the substrate surface 2a. Thus, if the laser beam 4 emitted from the semiconductor laser 3 enters into the optical waveguide 1 in a state in which a linear polarization direction of the laser beam 4 (direction of arrow Q) is parallel to the substrate surface 2a, a non-linear optical constant $d_{33}$ can be used to enable wavelength conversion. Further, in this case, an outgoing beam pattern of the laser beam 4 and a guided beam pattern thereof are coincident with each other, i.e., there is no mis-matching between the beam patterns. Thus, the laser beam 4 can be efficiently entered into the optical waveguide 1, such that intensity of the second harmonic generated is increased. The laser beam 4 is guided through the optical waveguide 1 in a TE mode, and an effective non-linear optical constant at this time is $d_{33}\cos\theta$.

When the light wavelength converting element obtained in this embodiment is used, efficiency of converting a wavelength to a second harmonic is 250%/W cm². This is considerably higher than wavelength converting efficiency of 180%/W cm² or the like obtained when a light wavelength converting element in which a periodic polarization inversion structure was formed by the above conventional method is used. This may result from the fact that generation of cracks is prevented due to the low voltages applied when the periodic inversion structure is formed, and from the fact that a uniform periodic inversion structure is formed in accordance with the electrode pattern.

(Second Embodiment)

Next, a second embodiment of the present invention will be described. Since this second embodiment is the same as the first embodiment except that application time of the pulse voltages is shortened and the number of applications of the pulse voltages is increased, description for portions that are the same will be omitted.

Figure 4C:
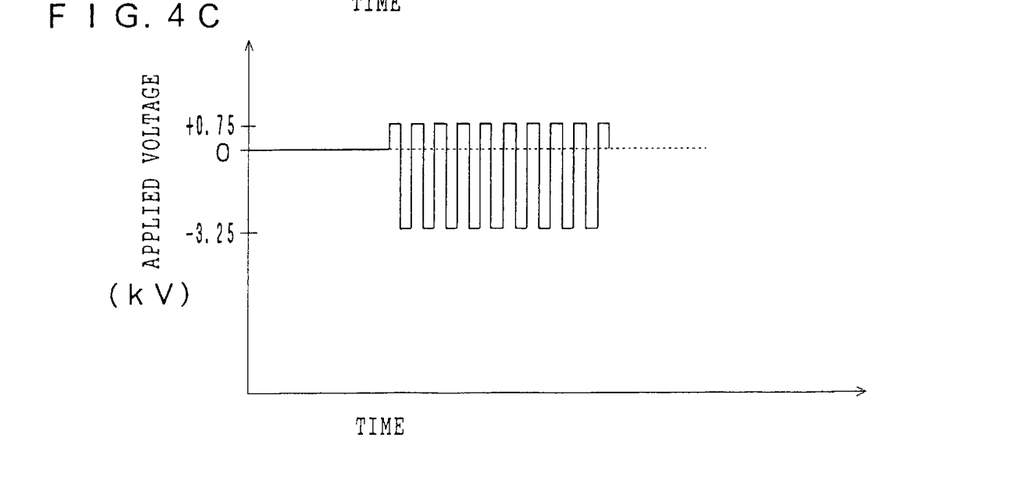
FIG. 4C is a timing diagram showing a pulse waveform of an applied voltage in a second embodiment.

In this embodiment, the following cycle is repeatedly conducted: in a state in which substrate temperature is at room temperature, the plate electrode 11 is grounded and the pulse voltage 1 of +0.75 kV, for example, is applied for a second or so such that the comb-shaped electrode 10 has positive potential. Thereafter, the comb-shaped electrode 10 is grounded and the pulse voltage 2 of −3.25 kV, for example, is applied for a second or so such that the plate electrode 11 has negative potential. The pulse waveform in this method is shown in FIG. 4C.

In the same manner as in the first embodiment, the pulse voltage 1 may have voltage value and pulse width of a degree such that the crystal is not broken. In this embodiment, a pulse voltage of +0.5 to +1.5 kV is preferably applied for 0.1 to 20 seconds. Further, if the pulse voltage 1 is applied for a longer time, the domain inversion portions 8 can be more deeply formed, and thus the number of applications of the pulse voltages can be reduced.

In the same manner as in the first embodiment, the voltage value and pulse width of the pulse voltage 2 may be selected from within ranges such that the crystal will not be broken, and the voltage value is not less than the coercive voltage. In this embodiment, the pulse voltage is applied a plurality of times so that a value of the pulse voltage 2 can be smaller than that of the first embodiment. However, in view of production efficiency, the pulse voltage 2 is preferably selected such that a potential difference 3 is 3 kV or more. Further, the pulse voltage 2 is a negative voltage which is smaller than 12 kV, and in order to prevent generation of cracks, the pulse voltage 2 is preferably a negative voltage no larger than 6 kV. The pulse width of the pulse voltage 2 is determined in accordance with the voltage value. For example, if the selected pulse voltage 2 is −3.25 kV, the voltage is preferably applied for 0.1 to 1 second.

The number of applications of the pulse voltage is a number required to form the periodic domain inversion portion to a desired thickness, and is suitably selected in accordance with the applied voltage value and the pulse width. In this embodiment, the suitable number of applications can be determined, for example, as shown in Table 1.

TABLE 1

| Potential Difference 3 | Pulse Voltage 1 | Pulse Voltage 2 | Number of Applications |
| --- | --- | --- | --- |
| 4 kV | 0.75 kV/0.5 sec. | −3.25 kV/0.5 sec. | 18 times |
| 4 kV | 0.75 kV/1.0 sec. | −3.25 kV/0.5 sec. | 15 times |
| 4 kV | 1.0 kV/1.0 sec. | −3.25 kV/0.5 sec. | 12 times |
| 4 kV | 1.5 kV/0.5 sec. | −3.25 kV/0.5 sec. | 10 times |
| 3 kV | 1.0 kV/1.0 sec. | −2.0 kV/0.5 sec. | 24 times |

In this embodiment, in the same manner as in the first embodiment, the positive pulse voltage 1 is applied such that the comb-shaped electrode, which is formed on the substrate surface at a side where the spontaneous polarization is negative, has positive potential, and thereafter the negative pulse voltage 2 is applied such that the plate electrode has negative potential. Thus, the charge accumulated when the positive pulse voltage 1 was applied moves all at once in accordance with the caused potential difference 3, such that a large quantity of current flows. As a result, even in an insulating liquid such as Fluorinert, a quantity of current required to obtain a desired inversion thickness can be obtained. Further, the voltage is dividedly applied a plurality of times, such that the load on the crystal substrate at each time of applying the voltage can be reduced, and such that the charge can be uniformly applied to the crystal substrate even with a low applied voltage. Therefore, the width and the depth of the domain inversion portion of the periodic polarization inversion structure can be easily controlled. Accordingly, a light wavelength converting element in which a desired periodic polarization inversion structure having a duty ratio of about 1:1 is uniformly formed can be produced with excellent yield.

When the obtained light wavelength converting element is used, efficiency of converting a wavelength to a second harmonic is 360%/W cm². This is even higher than the wavelength converting efficiency of the first embodiment. This may result from the fact that the desired periodic inversion structure having a duty ratio of about 1:1 can be formed, and from the fact that the load on the crystal substrate at each time of applying the voltage is reduced such that the generation of cracks is more reliably prevented.

(Third Embodiment)

Next, a third embodiment of the present invention will be described. Since this third embodiment is the same as the first embodiment except that the pulse voltage is applied in a vacuum, description for portions that are the same will be omitted.

The comb-shaped electrode 10 and the plate electrode 11 are attached to the MgO—LN substrate 2 prepared in the same manner as in the first embodiment, and this MgO—LN substrate 2 is disposed in a vacuum chamber (not shown). The degree of vacuum can be, for example, $5 \times 10^5$ Torr or lower. Then, in a state in which substrate temperature is at room temperature, the plate electrode 11 is grounded and the pulse voltage 1 of +0.75 kV, for example, is applied for one second such that the comb-shaped electrode 10 has positive potential. Thereafter, the comb-shaped electrode 10 is grounded and the pulse voltage 2 of −2 kV, for example, is applied for ten seconds such that the plate electrode 11 has negative potential.

The pulse voltage 1 has voltage value and pulse width of a degree such that the crystal is not broken. In this embodiment, a voltage of +1 kV, for example, can be applied for up to 40 seconds. However, if a voltage of +2 kV is applied for a time which exceeds 10 seconds, the longer the voltage continues to be applied, the greater the likelihood that the crystal will be broken. If a voltage of +2 kV is applied for a time which exceeds 20 seconds, the crystal will be broken. If a voltage of +2.5 kV is applied, the crystal will be instantaneously broken. Therefore, as the pulse voltage 1, a pulse voltage of +0.5 to +1.5 kV is preferably applied for 0.1 to 20 seconds. Further, if the pulse voltage 1 is applied for a longer time, the domain inversion portions 8 can be more deeply formed.

The voltage value and pulse width of the pulse voltage 2 may be selected from within ranges such that the crystal will not be broken, and the voltage value is not less than the coercive voltage. In this embodiment, after the pulse voltage 1 has been applied, the pulse voltage 2 is selected such that a potential difference 3 between the pulse voltage 1 and the pulse voltage 2 is 2.0 kV or more. The selected pulse voltage 2 is applied for 1 to 10 seconds. As a result, a uniform periodic polarization inversion structure can be formed. If the potential difference 3 is less than 2.0 kV, a sufficient quantity of current cannot be obtained, and the uniform periodic polarization inversion structure cannot be formed. Further, in this embodiment, the crystal is instantaneously broken when a voltage of −4 kV is applied, and the crystal is broken when a voltage of −3.5 kV is applied for 10 seconds or longer. Therefore, the pulse voltage 2 is a negative voltage which is smaller than 3.0 kV. For example, in the above example, because the pulse voltage 1 is +0.75 kV, the pulse voltage 2 of −2.0 kV can be applied.

In this embodiment, as described above, the positive pulse voltage 1 is applied such that the comb-shaped electrode, which is formed on the substrate surface at a side where the spontaneous polarization is negative, has positive potential, and thereafter the negative pulse voltage 2 is applied such that the plate electrode has negative potential. Thus, the charge accumulated when the positive pulse voltage 1 was applied moves all at once in accordance with the caused potential difference 3, such that a large quantity of current flows. Accordingly, even with an applied voltage lower than a conventional voltage, the uniform periodic polarization inversion structure can be formed, and the light wavelength converting element can be produced with excellent yield.

When the obtained light wavelength converting element is used, efficiency of converting a wavelength to a second harmonic is 400%/W cm$^2$. This is considerably higher than wavelength converting efficiency of 180%/W cm$^2$ or the like obtained when the light wavelength converting element in which the periodic polarization inversion structure was formed by the above conventional method is used. This may result from the fact that the generation of cracks is prevented due to the low voltages applied when the periodic inversion structure is formed, and from the fact that a uniform periodic inversion structure is formed in accordance with the electrode pattern.

In the above first to third embodiments, examples in which the voltages are applied with the substrate temperature being set at room temperature have been described. However, if the substrate temperature is increased, the coercive voltage is decreased, and thus the substrate temperature at the time of applying the voltage may be set to at least 40° C. so that the periodic inversion structure can be formed with an even lower applied voltage.

Further, in the above first to third embodiments, examples in which an optical waveguide type light wavelength converting element is produced have been described. However, the present invention can be applied to production of a bulk type light wavelength converting element having a periodic polarization inversion structure.

In accordance with the production method of the present invention, a uniform periodic polarization inversion structure can be formed in a unipolarized ferroelectric crystal substrate having a non-linear optical effect by applying a low voltage thereto, and a light wavelength converting element can be produced with excellent yield.

Further, in accordance with the production method of the present invention, the uniform periodic polarization inversion structure can be formed, and the light wavelength converting element can be produced with excellent yield, even if the periodic polarization inversion structure is formed in an insulating liquid.

What is claimed is:

1. A method for producing a light wavelength converting element, the method comprising steps of:

forming a first electrode having a predetermined pattern on a surface of a unipolarized ferroelectric crystal substrate having a non-linear optical effect, at a side where spontaneous polarization of the substrate is negative, and forming a second electrode opposite to said first electrode; and grounding said second electrode and applying a first pulse voltage such that said first electrode has positive potential, and then grounding said first electrode and applying a second pulse voltage such that said second electrode has negative potential, so as to form a periodic polarization inversion structure in said ferroelectric crystal substrate.

2. A method according to claim 1, wherein said step of grounding is repeated a number of times.

3. A method according to claim 2, wherein said number of times is determined in accordance with voltage value and application duration of said pulse voltages.

4. A method according to claim 3, wherein application of said pulse voltages is controlled such that, in the periodic polarization inversion structure, a ratio of width of a domain inversion portion to width of a domain non-inversion portion is substantially 1:1.

5. A method according to claim 1, wherein said pulse voltages are applied in a state in which said ferroelectric crystal substrate is at a temperature of at least 40° C.

6. A method according to claim 2, wherein said pulse voltages are applied in a state in which said ferroelectric crystal substrate is at a temperature of at least 40° C.

7. A method according to claim 1, wherein said pulse voltages are applied in a state in which said ferroelectric crystal substrate is in a vacuum.

8. A method according to claim 1, wherein said pulse voltages are applied in a state in which said ferroelectric crystal substrate is in an insulating liquid.

9. A method according to claim 2, wherein said pulse voltages are applied in a state in which said ferroelectric crystal substrate is in a vacuum.

10. A method according to claim 2, wherein said pulse voltages are applied in a state in which said ferroelectric crystal substrate is in an insulating liquid.

* * * * *